United States Patent
Pavlovich et al.

[11] Patent Number: 5,892,307
[45] Date of Patent: Apr. 6, 1999

[54] BRUSHLESS DC MOTOR

[76] Inventors: Lisseikine Viatcheslav Pavlovich, 192281 St Petersburg, Dunalsky, Russian Federation, np g43kb798; Juline Michail Arkadievich, 198052, St-Peterburg, 7 Krasnoarmeiskagia, 191417, Russian Federation

[21] Appl. No.: 565,363

[22] Filed: Nov. 30, 1995

[30] Foreign Application Priority Data

Mar. 7, 1995 [RU] Russian Federation ............ 95103336

[51] Int. Cl.⁶ .................................................. H02K 29/00
[52] U.S. Cl. ........................ 310/68 B; 310/268; 310/156; 310/61; 310/181
[58] Field of Search ................................ 310/268, 61, 58, 310/59, 60 R, 60 A, 89, 156, 68 B, 181

[56] References Cited

U.S. PATENT DOCUMENTS

| | | | |
|---|---|---|---|
| 700,335 | 5/1902 | Keiley | 310/61 |
| 3,017,526 | 4/1962 | Luenberger | 310/89 |
| 3,579,277 | 5/1971 | Imahashi | 310/156 |
| 4,125,792 | 11/1978 | Schmider | 310/268 |
| 4,451,749 | 5/1984 | Kanayama et al. | 310/60 R |
| 4,475,068 | 10/1984 | Brailsford | 318/259 |
| 4,510,409 | 4/1985 | Kanayama et al. | 310/60 R |
| 4,536,672 | 8/1985 | Kanayama et al. | 310/268 |
| 4,684,835 | 8/1987 | Kline, Jr. et al. | 310/59 |
| 4,684,857 | 8/1987 | Llopis | 318/313 |
| 4,726,490 | 2/1988 | Saldinger | 310/184 |
| 4,795,936 | 1/1989 | Crosetto et al. | 310/156 |
| 4,853,604 | 8/1989 | McMullin et al. | 318/653 |
| 4,864,175 | 9/1989 | Rossi | 310/156 |
| 4,894,572 | 1/1990 | Shiraki | 310/68 B |
| 5,101,131 | 3/1992 | Ushiro et al. | 310/258 |
| 5,144,175 | 9/1992 | Craggs | 310/63 |
| 5,179,307 | 1/1993 | Porter | 310/68 B |
| 5,394,041 | 2/1995 | Oberdorger-Bogel | 310/64 |
| 5,396,140 | 3/1995 | Goldie et al. | 310/268 |
| 5,455,474 | 10/1995 | Flynn | 310/268 |
| 5,469,054 | 11/1995 | Bicking | 324/207.2 |
| 5,493,599 | 2/1996 | Mattson | 378/147 |

FOREIGN PATENT DOCUMENTS 8401062  6/1984  WIPO .

Primary Examiner—Steven L. Stephan
Assistant Examiner—B. Mullins
Attorney, Agent, or Firm—Tarolli, Sundheim, Covell, Tummino & Szabo

[57] ABSTRACT

An improved design brushless DC motor has a rotating disk type rotor with trapezoidal shaped permanent magnets connected by a closed magnetic circuit and a stator mounted inside the motor coaxially with the rotor and also having ttrapezoidal shaped stator coils located in the magnetic field generated by the permanent magnets of the rotor. The active parts of the stator coil windings are oriented in a radial direction and are configured to have a width equal to between 0.2 and up to 0.4 of the pole pitch length with the angle between two radiuses which pass through the center of the active part of each coil equal to 360/n (where "n" is the number of magnets). In addition—one or both base lines of each trapezoid is perpendicular to the disk radius and is between 0.7 and up to 0.9 of the pole pitch length. The rotor of the motor comprises three parallel disks and the stator two stator windings with each stator winding positioned between the external and internal disks. Motor cooling is provided by inlet holes in the external disks being formed at an angle oriented in the direction of disk rotation and from the disk center to the periphery thereof with housing side holes also formed at an angle in the direction of the rotor rotation.

35 Claims, 5 Drawing Sheets

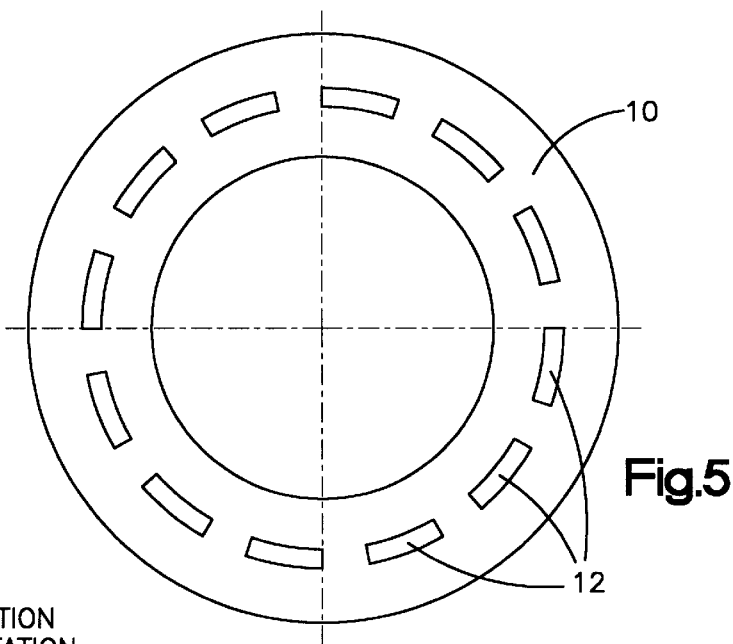
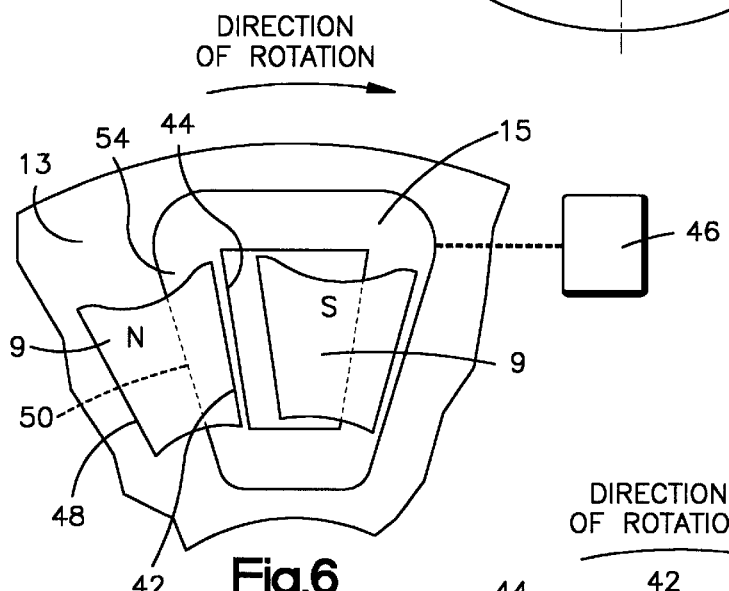
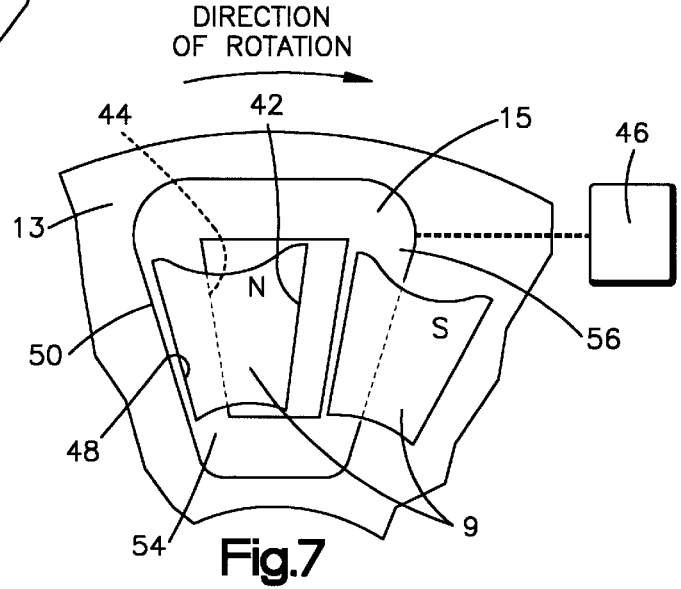

BRUSHLESS DC MOTOR

BACKGROUND OF THE INVENTION

1. Field of the Invention

The present invention is generally drawn to brushless DC permanent magnet motors and more particularly to improved design disk type DC motors having permanent magnets on the rotor and stator coils.

2. Description of the Prior Art

A DC motor consists of two basic parts: a field-frame assembly or stator and an armature assembly or rotor. The armature rotates in a magnetic field that acts upon the current-carrying wires. The motor operates because a coil of wire that current is flowing through will rotate when placed in a magnetic field, until the coil aligns itself with the magnetic field. At the point just before the rotation would stop, brushes and a commutator are normally used to reverse the current in the coil. This commutator action causes the coil to continue rotating. The amount of torque developed in the coil depends on the strength of the magnetic field, the number of turns of wire in the coil, and the position of the coil in the magnetic field. Since there is a torque acting on each turn in the coil, the greater the number of turns, the greater the torque.

In most motors the magnetic field is furnished by an electromagnet, which can be made much stronger than a permanent magnet. The current to energize the electromagnet comes from the same source that supplies current to the armature.

Some applications for DC motors are: drives for food processing equipment, vacuum cleaners, main drives for electrical vehicles, drives of pumps, high speed centrifuges, gyros, etc.

Brushless DC motors have a very promising future as DC motors find more and more applications. The reason for the increased use of brushless DC motors comes from the fact that these motors have several significant advantages over old brush type motors. Brushless DC motors are more reliable due to the absence of the collector-brush set which is the most unreliable part of the DC motor. Also, brushless motors have better electromechanical and power output parameters.

Today, the use of brushless DC motors is found in a wide variety of devices for household electrical devices using only several watts of power to electrical vehicle motors using many kilowatts of power.

Nevertheless, in some areas where high power high RPM motors are required, the use of brushless DC motors is still limited. This is due to the fact that with the increase of RPM the loses due to heat generated in the iron stator of these motors increase as well. This leads to reduced motor efficiency and a reduction of the motor power output.

Obviously, avoiding the use of iron in brushless DC motor stators can thus seemingly solve the problem. However, in such cases the heat sink from the stator winding becomes very limited and motor overheating and destruction can easily occur. In such cases the need for a more efficient heat removal system for removing heat from the stator windings becomes imperative.

When brushless DC motors are designed, one of the main goals is to increase the reliability of the motor. The Rotor Position Sensor, it's design and location play a critical role in achieving this goal of motor increased reliability.

Efforts to solve the above described problems have been made by motor designers around the world as may be seen from numerous prior art patents which claim to have solved these mentioned problems.

PCT patent application WO84/01062 discloses a brushless disk-type DC motor which describes a rotor made as a ring shaped multipolar permanent magnet with the axial direction of the magnetic field being known. The permanent magnet rotor is located on a supporting plate and is magnetically connected by a ring magnetic circuit. The stator is made of flat windings which are electrically shifted with respect to each other by 90 degrees. The stator is mounted on the main motor frame and is axially aligned with the rotor permanent magnets. The stator winding rotating field (the stator does not have any iron) interacts with the permanent magnet polar field. Rotor Position Sensors are Hall devices mounted on the motor main frame and control alternate connections of the windings to the DC circuit.

The shortcoming of this described motor design is poor heat removal from the rotor windings because the motor fails to provide sufficient ventilation. This in turn leads to overheating of the coils, lower motor efficiency and reduced motor output power. These disadvantages become most pronounced for motors with medium and high power output (more than 100 W).

Another problem with this motor design comes from the use of one circular magnet as a rotor. This is not acceptable for high speed applications because the mechanical strength of permanent magnets is insufficient under these high RPM conditions.

Yet another shortcoming of this motor design comes from the mounting of the Hall devices on the stator itself. The magnetic field of the windings produces magnetic noise and interferes which interacts with the Hall devises to prevent their proper operation. All these forementioned design problems reduce the reliability of such prior art brushless DC motors.

Another known type of known brushless DC motor is disclosed in French Patent No. 70.01600. The motor disclosed therein has a multipolar rotor with a number of high coercive force bi-polar magnets arranged opposite to each other. Flat stator windings are located on a plate made of insulating material which plate is rigidly attached to the motor housing with the plane thereof oriented perpendicularly to the rotor axis. The active parts of the stator windings are oriented radially. The flat stator winding is located between the rotor parallel disks. This motor design with the use of separate permanent magnets attached to the disk instead of a single multipolar magnetic ring, as described in the previous design motor, allows the present motor to achieve higher speeds. However, even this design still faces the same problem of sufficient heat removal from the stator windings. Further, as may be best seen in the drawings and related description found in this patent, the ratio between the width of the magnet and the width of the active section winding located along the rotor disk radius is not optimal and thus does not provide maximum motor efficiency and maximum motor specific power.

Yet a third type of disk type brushless DC motor design in disclosed in Russian Patent SU1494877 A3. The motor described therein consists of a co-axially positioned stator and rotor. The rotor has permanent magnets. The stator has armature winding. The active surface of the winding faces the active surface of the permanent magnet poles with the same polarity. The armature windings are made as separate coils formed in a group located in the permanent magnet field with an angular displacement relative to each other. There is a switching device for an alternate connection of the group of coils of the armature to the DC bus. Also every coil or every permanent magnet is equipped with a device capable of regulating the force of magnetic interaction between the permanent magnet and the current in the coil in a circular direction. One of the motors is shown to have a stator with two active surfaces located opposite a mounted rotor disk. The second disk is a mirror image of the first one. Each disk is equipped with permanent magnets. The polarity of the rotor disk magnet located on one side of the stator is opposite to the polarity of the disk located on the other side of the stator.

This design improves mass and dimensional parameters but makes the use of magnets and the active parts of the stator winding less efficient. This lack of efficiency is due to the magnet blocking a part of the coil during its movement which blockage creates an opposite direction torque. Further, this design again fails to provide sufficient heat removal from the motor during high speed operation.

One of the main shortcomings of this last described design is that the Rotor Position Sensor (RPS) therein uses separate disks as signal elements. This complicates the motor design and leads to additional power losses. However, a benefit therefrom is a more stable operating unit due to the fact that the RPS is located outside of the stator winding field.

In view of the foregoing it will be seen that the prior art brushless DC motor designs failed to provide an simple construction efficient high speed brushless DC motor of optimized efficiently and reliability and having a cooling system for proper ventillation and heat removal during the whole operating range of motor speed or RPM.

BRIEF SUMMARY OF THE INVENTION

The present invention solves the known problems associated with prior art brushless DC motor designs as well as others by providing a brushless DC motor having a rotating disk type rotor with permanent magnets connected by a closed magnetic circuit. The motor stator is mounted inside the motor housing co-axially with the rotor. The stator has coils located in the magnetic field generated by the permanent magnets of the rotor. The active parts of the stator coil windings are oriented in a radial direction. The motor has a Rotor Position Sensor (RPS) which is located opposite the permanent magnets and is located on the same side as the magnetic circuit.

The rotor and stator design is optimized by making the width of the active part of the stator coil windings equal to between 0.2 and up to 0.4 of the pole pitch length, and the angle between two radiuses which pass through the center of the active part of each coil equal to 360/n (where "n" is the number of magnets). In addition, one or both base lines of each trapezoid is curved and the centerline of each trapezoid perpendicular to the disk radius and is between 0.7 and up to 0.9 of the pole pitch length. The rotor of the motor comprises three parallel disks and the stator two stator windings. Each stator winding is positioned between the external and internal disks.

An improved motor cooling system is provided by having the external rotor disk and the upper and lower parts of the motor housing have vent holes formed therein for cooling air circulation. These holes are formed opposing each other and the external disk inlet holes are located between the rotor axis and the permanent magnets. The frame side surface has outlet holes formed therein located opposite air gaps between the rotor disks and the stator windings. It was found to be necessary for optimal motor cooling to form the inlet holes in the external disks at an angle which was oriented in the direction of disk rotation with these holes extending from the disk center toward the periphery thereof. It was also found necessary to orient the housing side holes at an angle in the direction of rotor rotation. For sufficient motor cooling at low speed motor operation, the rotor external disks are equipped with blades directed toward the side where the internal disk is located and positioned between the rotor axis and the magnets. The blades are tilted in such a way that neither side of any blade crosses the disk center.

For maximum torque a trapezoidal functional relationship between motor torque and rotation is necessary. To accomplish this end, at least one of the magnetic circuits was arranged to have windows which are arranged around a circumference of the permanent magnet zone with the Rotor Position Sensor (RPS) located opposite to the windows. The distance between the two side edges of the window is determined by the following equation:

$$Z=(0.8 \rightarrow >1.2)*W*Q/180,$$

where: W=length of a chord which connects the center of two adjoining windows.

Q=commutation Zone.

Z=distance between windows.

In view of the foregoing it will be seen that one aspect of the present invention is to provide a brushless DC motor having a trapezoidal relationship between motor torque and the angle of rotor rotation.

Another aspect of the present invention is to provide an improved cooling system for brushless DC motors operating over a wide range of RPM's.

Yet another aspect of the present invention is to provide an improved cooling blade for the rotor of a brushless DC motor cooling system.

Still yet another aspect of the present invention is to provide a brushless DC motor having circumferential windows in the permanent magnet zone thereof with RPS optimally located with respect thereto according to a predetermined equation.

These and other aspects of the present invention will be more fully understood after a consideration of the description of the preferred embodiment along with the accompanying drawings as follows.

BRIEF DESCRIPTION OF THE DRAWINGS

The attached drawings depict the essence of the present invention as follows:

FIG. 5 is a cross-sectional end view of the FIG. 1 motor showing the windows of the circular circuit therein.

FIG. 6 is an expanded view of a segment of the stator ring of FIG. 4 shown in a first position with respect to the rotor disk magnets.

FIG.7 is a view of the stator ring segment of FIG. 6 shown in a second position with respect to the rotor disk magnets.

DETAILED DESCRIPTION OF THE PREFERRED EMBODIMENT

Figure 1:
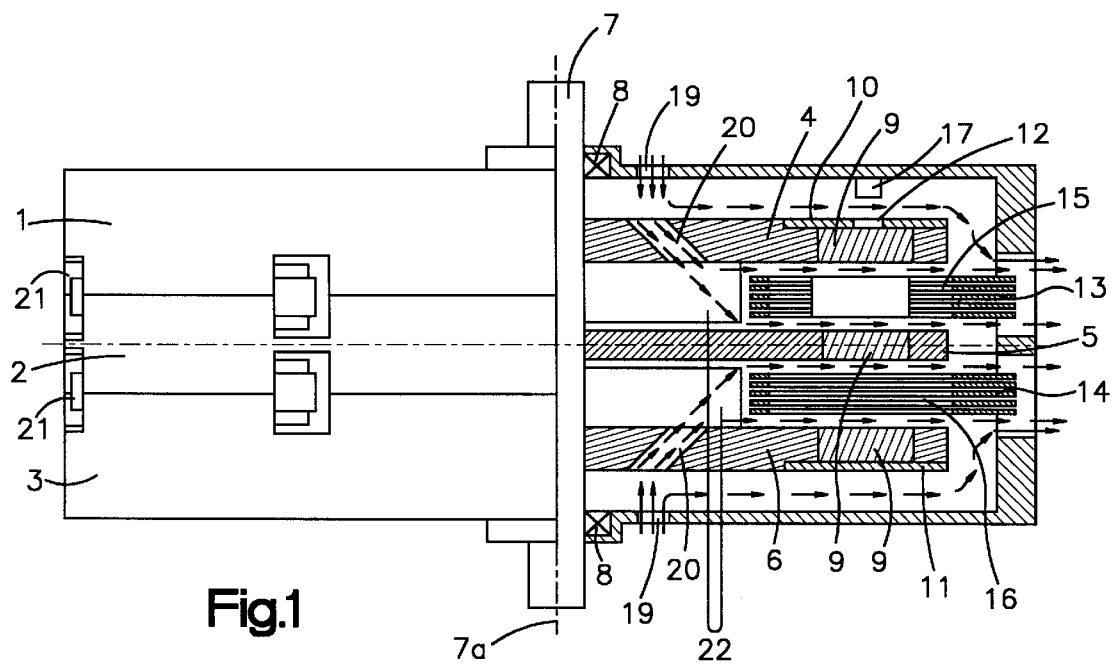
FIG. 1 is a cross-sectional view of the brushless DC motor of the present invention.
Figure 3:
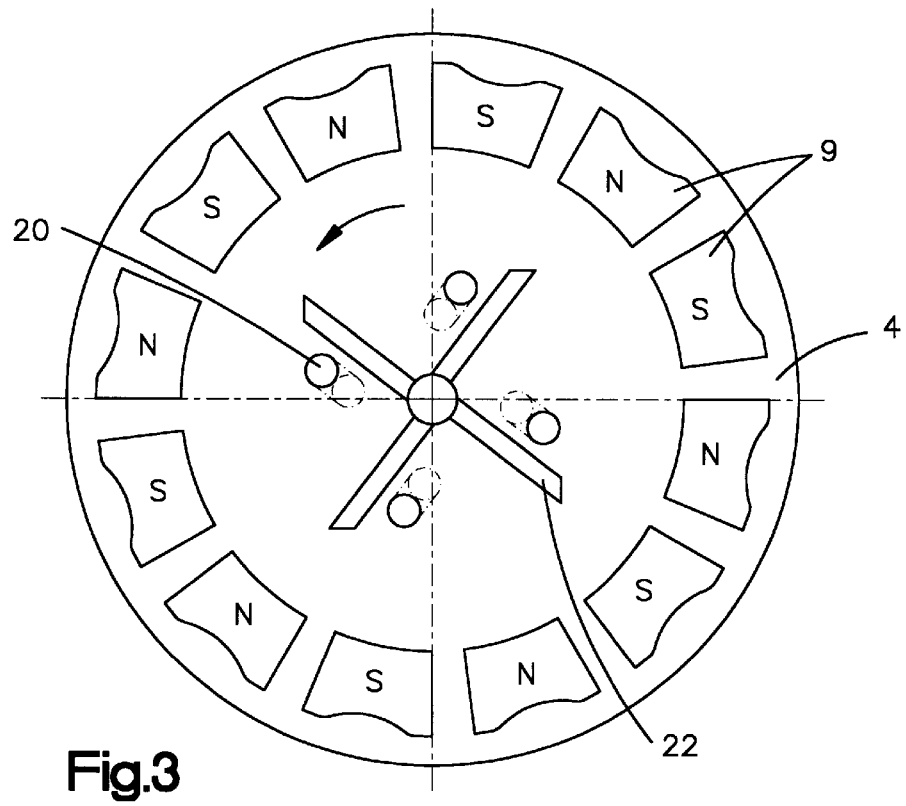
FIG. 3 is a cross-sectional and view of the FIG. 1 motor showing the rotor disk, magnets, vent holes and cooling blades therein.
Figure 4:
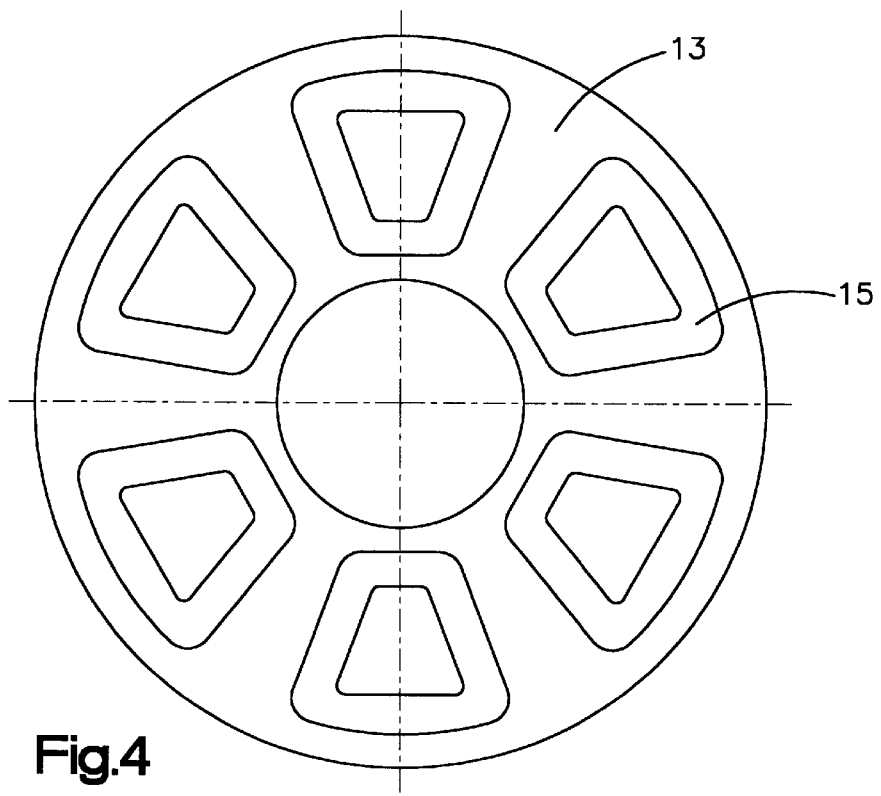
FIG. 4 is a cross-sectional end view of the FIG. 1 motor showing the stator ring and coils therein.

Referring now to the drawings, it will be understood that the showings therein are intended to depict a preferred embodiment of the invention and are not intended to limit the invention thereto. Thus as best seen in FIG. 1, the brushless DC motor assembly is shown to have a housing, which is divided into three parts; an upper part (1), a middle part (2) and a lower part (3). A composite rotor assembly is shown to consist of three disks (4, 5, 6) and is rigidly fixed to a shaft(7) in a known manner. The shaft (7) is supported by bearings (8) of a known design which are mounted in the upper part (1) and lower part (3) of the housing assembly. As is best seen in FIG. 3, each disk (4,5,6) consists of twelve permanent magnets (9) of alternate polarity, which are magnetized in an axial direction. Each external disk (4) and (6) is equipped with circular magnetic circuits (10, 11) having windows (12) formed therein as shown in FIG. 5. The magnetic circuits (10, 11) are members which conduct magnetic flux. The windows (12) are openings in the magnetic circuits. A two phase stator of the motor assembly consists of two stator rings (13,14) with coils (15,16). The stator rings (13,14) are rigidly fixed in the housing assembly and are located in such a way that the stator ring (13) is positioned between the external disk (4) and the internal disk (5). The stator ring (14) is positioned accordingly between the external disk (6) and the internal disk (5) forming corresponding air gaps. The coils (15) of one phase are located on the ring (13) and the coils (16) of the other phase located on the ring(14). The number of coils on each of the stator rings (13, 14) is two times less than the number of magnets mounted on the disk. Thus, there are six coils (15, 16) on each stator ring (13, 14) and twelve permanent magnets (9) on each rotor disk (4, 5, 6). The coils (15,16) are shifted at an angle equal to 360/2n degrees with respect to each other in the rotor rotation plane, where "n" is the number of permanent magnets. In the present embodiment twelve permanent magnets are used and the coils (15, 16) are shifted fifteen degrees with respect to each other in the rotor rotation plane.

Figure 2:
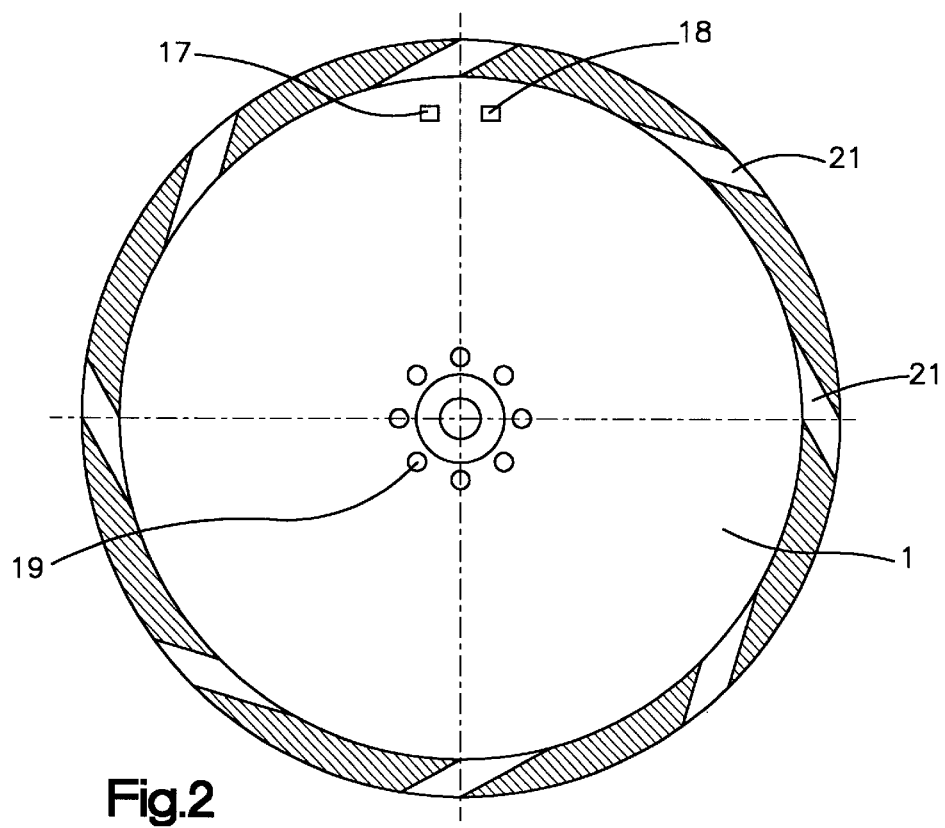
FIG. 2 is a bottom view of the upper part of the FIG. 1 motor housing showing the ventilation holes and Hall devices located therein.

Rotor Position Sensors (17 and 18), as best seen in FIG. 2, are known Hall devices typically used in brushless DC motors and are located on the motor housing assembly upper part (1) opposite windows (12) of the magnetic circuit (10). They control the motor phase through a known transistor commutator (not shown). The twelve windows (12) are equal to the number of magnets (9) and are determined by a mathematical equation which will be described in detail later in the write-up.

In order to achieve one of the main goals of the present invention, namely an improvement in the heat removal from the stator coils of the motor assembly, a triple disk brushless DC motor is used with double sided cooling of each stator coil. The air movement from the center of the motor to the periphery is provided primarily by forces of molecular friction between the air controlling the direction of the cold air intake and hot air release. Air flow holes (20) (FIGS. 1 and 3) are located between the rotor axes and permanent magnets. In order to make the air movement easier, the holes (20) are sloped or tilted in the direction of rotation from the disk center toward its periphery. Thus, entrance openings to the holes (20) are disposed adjacent to the center of the rotor disk (4). Exit openings from the holes (20) are offset from the entrance openings in a direction opposite to the direction of rotation of the rotor disk (4) and in a direction toward the periphery of the rotor disk (FIGS. 1 and 3). The motor housing assembly also has vent holes (21) for hot air release from the motor. These vent holes are located on the housing side surfaces opposite to the air gaps which are formed by the rotor disks (4,5,6) and stator rings (13,14). The upper and lower parts of the motor housing assembly are provided with holes (19) for cold air intake. These holes (19) are located opposite to the holes (20) in the rotor disks (4,6). This improved motor cooling or ventilation system allows an improved heat removal efficiency of 5 to 10 times prior art systems provide under medium motor rotational speed conditions (from 3000 to 10,000 RPM) and a increased efficiency from 10 to 15 times under higher rotary speed conditions. This improved heat removal efficiency allows an increase in motor power by a factor of 2 or 3 times to the known prior art brushless DC motors.

As was mentioned, the efficiency of this cooling system is lower at the lower RPM's due to the deficiency of the molecular friction forces between the air and the disk surfaces. In order to reduce this negative effect, the external disks are equipped with blades which are directed toward the internal disks and are located between the rotor axis and magnets. To reduce the resistance to the exhaust of the heated air from the motor space, the outlet holes on the housing side surface are sloped or tilted in the direction of motor rotation.

Referring to FIGS. 1–3 it will be seen that the above generally described cooling system includes holes (19) for inleting cold air entry in the motor space. These holes (19) are located on the upper (1) and lower (3) parts of the motor housing assembly near the axis of rotation. Vent holes (20) are located on the external disks (4) and (6) between the shaft (7) and magnets (9) and are located opposite to the holes (19). The vent holes (20) are tilted in the direction of motor rotation extending from the disk center toward the periphery thereof. This tilting provides enhanced movement of the cool air cooling the motor assembly. Outlet holes (21) are located on the upper (1) middle (2) and lower (3) housing side surface as may be best seen in FIG. 2. These holes are also tilted in the direction of motor rotation. The external disks (4) and (6) are equipped with blades 22 positioned between the shaft (7) and magnets (9).

FIG. 1 shows the direction of the venting air flow which provides the cooling to the motor assembly. The stream of cold air passes through the inlet holes (19) in the upper (1) and the lower (3) parts of the motor housing and enters the motor space. These streams then pass through the holes (20) which are tilted in the rotational direction of the external disks (4) and (6) surfaces. At lower RPM, when the forces of the molecular friction are not sufficient, the air streams are moved up by the blades (22). The warm air streams carry-out the heat from the motor housing space through the outlet holes (21) shown in FIG. 2. Thus it is seen that the improved motor cooling system operates under a wide range of motor speeds to provide optimal motor cooling.

Figure 10A:
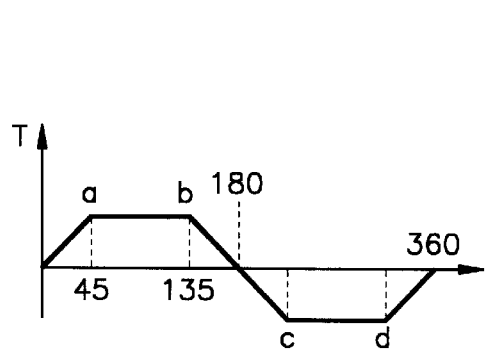
FIG. 10 is a graphical depiction of the trapezoidal function between the shaft torque and the rotor turn angle of the FIG. 1 motor.
Figure 10B:
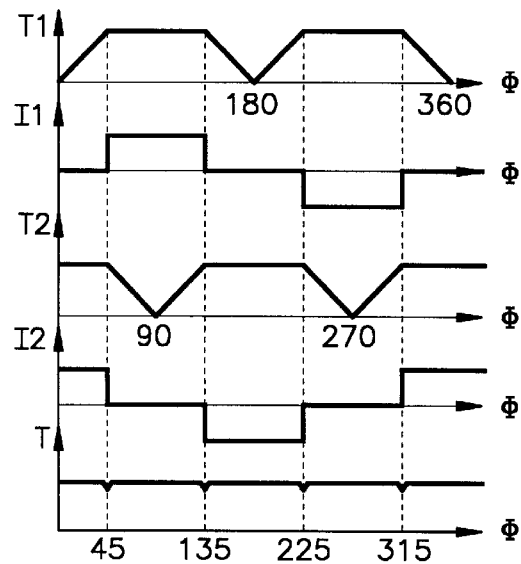

Turning next to the electromagnetic operation of the motor assembly, it should be noted that it is advantageous to have the motor shaft torque (T) be produced as a function of the rotor turn angle ($\phi$) in the shape of trapezoid when direct current flows through the stator phase windings. This functional relationship increases the motor efficiency as is shown in FIG. 10 drawing a. In two phase motors, the flat vertex of the trapezoid "ab" and "cd" cover at least 90 degrees, and the current in the winding is on primarily during the "ab" segment at one polarity, and at the "cd" segment at another polarity. High efficiency is achieved in the foregoing design due to the fact that the current exists only during the time when the stator winding and rotor magnet interactive forces are at their maximum level. The windings of the second phase are shifted with respect to the first phase windings by 90 degrees during the commutation period (one half of the pole pitch) and the current on the edge occurs with the 90 degrees shift similar to the first phase as seen in FIG. 10 drawing b. Since the rotor shaft torque is equal to the sum of torques of both phases and since these torques are constant while the system is "on," the total motor torque is thus made to be practically constant, as may be seen in FIG. 10 drawing b where:

TI ($\phi$)=first phase torque
$I_2$ ($\phi$)=first phase current
T ($\phi$)=motor shaft torque The requirements of maintaining a constant torque during the "ab" and "cd" motor operation areas (see FIG. 10 drawing a) are of prime importance since the efficiency and the consistency of motor RPM depends thereon.

It is necessary to maintain a given ratio between the width of the winding active coil and the magnet widths in order to achieve this trapezoidal shape functional relationship between the motor shaft torque and rotor turn angle. The interactive force of the magnet and the coil is thus determined by the following know equation:

$$F=B*I*l* \cos \alpha$$

Where:
B=flux density in the coil and magnet interactive zone
I=current in the coil
l=length of the conductors located in the magnetic field
$\alpha$=the angle between the magnetic flux density vector and the current density.

Since in the motor of the present invention the angle between the magnetic flux density vector and the current direction is 90 degrees and the thickness of the coil is constant, the previous equation for the magnet and coil interactive force can be modified as follows:

$$F=B*I*S$$

where: S=coil area which interacts with the magnet.

In order to maintain the interactive force "F" constant while the current "I" stays unchanged, it is necessary to have coil area "S", which is in the magnetic field during the magnet is turning 90 degrees during the motor commutation period, to be constant as well. This is necessary since the flux density in the gap between magnets was assumed to be constant. Therefore, since the magnet width can be bigger or smaller than the coil active part an analysis of these conditions will be made.

Figure 11A:
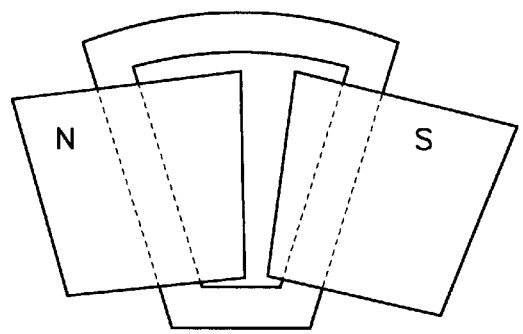
FIG. 11 depicts the effects of using a narrow and wide magnet in the FIG. 1 motor.
Figure 11B:
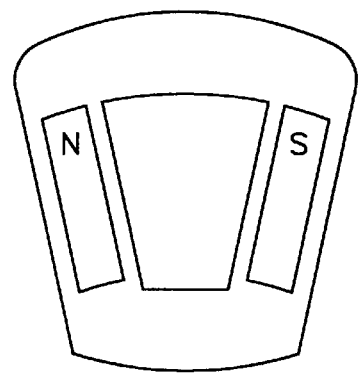
Figure 12A:
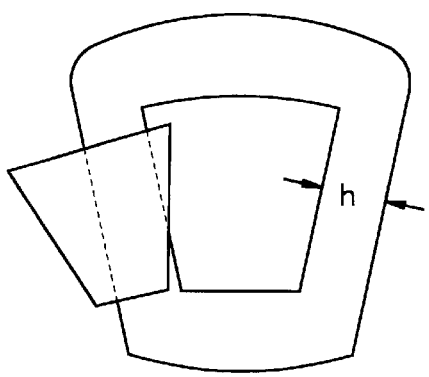
FIG. 12 is a graphical representation of various dimensional ratios between the coils and magnets of the FIG. 1 motor.
Figure 12B:
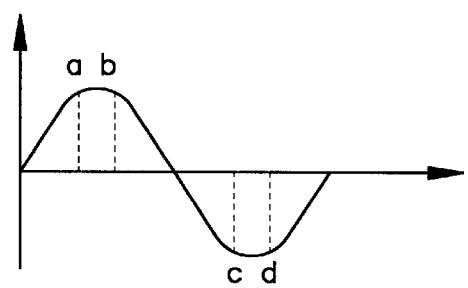
Figure 12C:
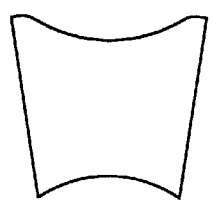
Figure 12D:
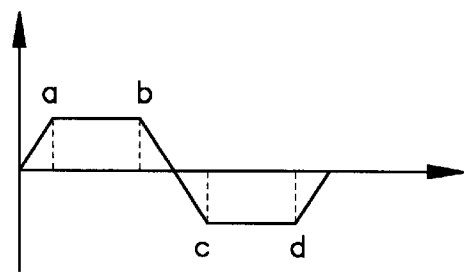

If one selects a magnet narrower than the coil active part, the result is a lower motor efficiency than if the selected magnet would be wider than the coil active part. This occurs because when the narrow magnet is used, see FIG. 11 drawing b, the ratio between the active zone area, which determines the interactive force, and the coil total area is lesser than in the case with the wider magnet, see FIG. 11 drawing a. This explains why a magnet wider than the coil active part must be used in the motor of the present invention. However, the magnet width should be maintained smaller than the pole pitch by the area of the rotor disk between adjacent magnets, which cannot be removed because it provides the rotor disk with the required additional strength at high speed motor operation.

The distance between adjacent magnets can be from 0.1 to 0.3 of the pole pitch. Therefore the width of the magnet should be from 0.7 to 0.9 of the pole pitch width. To determine the zones "ab", "cd" (FIG. 10 drawing a) of the trapezoid which are equal to 90 degrees of the commutation period (half of the pole pitch), the difference between the width of the coil active part and the width of the magnet should be 0.5 of the pole pitch and therefore the width ("h") (FIG. 12 drawing a) of the coil active part should be between 0.4 and 0.2 of the pole pitch.

However, in the actual designs of the disk type brushless DC motors, getting such a zone with a constant function is difficult, since normally used trapezoidal shape magnets (FIG. 12 drawings A and B) and coils with the wires oriented in parallel with the radius, have "ab" and "cd" zones of insufficient length (see graph of T($\phi$)—FIG. 12 drawings A and B) with a constant torque. This is explained by the influence of the magnetic system fringe effect and the magnet width reduction from the periphery to the center. Usually, in order to increase the length of these zones, the reduction of the coil side width is needed. However, this leads to the motor power drop and therefore to the efficiency loses.

The distinctive feature of the motor of the present invention is the increased length of the zone with a constant torque which is provided by selecting a certain predetermined magnet shape. One or both bases of the trapezoidal magnet are made concave (see FIG. 12 drawings C and D). The function between the motor shaft torque and the rotor turn angle ($\phi$) as shown on the same FIG. 12 drawing b. This way, by selecting the said shape and dimensional proportions of the permanent magnets and the stator coils, one can achieve the desired length of the motor shaft constant torque zone without reducing the width of the coil side.

In most instances, in motors where the magnets are used to control known Hall devices, the magnets length is selected so it corresponds to the commutation zone. The length of the magnet in the invented motor is 0.7 to 0.9 of pole pitch, and commutation zone is selected at 90 degrees (one half of pole pitch). Thus it is impossible in the present case to control these Hall devices directly by the magnets. We found the following solution to this problem. The circular magnetic circuit is made with windows located above the magnets. Part of the magnetic flux passes through these windows beyond the magnetic circuit and thus activates these Hall devices. It should be kept in mind that the portion of the magnetic flux which exits these windows is negligible compare to the total magnet flux density and therefore the motor power is not lowered in any significant way.

In general, the distance between side edges of these windows in the magnetic circuit can be determined by the following empirical equation:

$$Z=(0.8 \text{ to } 1.2)*W*Q/180,$$

Where: W=chord of the circular arc which connects centers of two adjoining windows.
Q=commutation zone.

The selection of this ratio was based on the following considerations: the coil parameters (size, inductance) of different motors is changed depending on the required power and RPM values. Therefore, when the distance between the window side edges is calculated, it is necessary to consider the time of current rise in the stator coils, which depends on the stator coils inductance. In this case the commutation zone "Q" can vary depending on the parameters of a particular motor. The chord length "W" corresponds with 180 degrees commutation period, therefore W/180 represents 1 degree of the commutation period in linear units. W*Q/180 will correspond with selected commutation Zone "Q" expressed in the linear units. Coefficient 0.8 to 1.2 were selected because the magnets used in the motor could have different properties (surface flux density, flux density reduction as the distance to the magnet increases), and therefore the magnetic flux which is passing through the magnetic circuit windows will change. In this case, the distance between the window side edges shall be adjusted depending on the particular magnet properties.

Keeping in mind the foregoing theoretical discussion of the basic principals of the operation of the brushless DC motor of the present invention, it will be seen that the motor operation of the motor assembly is best shown on FIGS. 6, 7, 8, 9. The motor assembly is a two phase unit and works as follows:

Position sensor (17) controls the operation of the first phase and is located in such a way that it turns "on" the current through the phase coils when the magnet 9 edge coincides with the edge of the coil 15 active part along the centerline of the magnet (FIG. 6). At this time, the magnetic circuit 10 window 12 edge is positioned opposite to the sensor 17 (FIG. 8).

Figure 9:
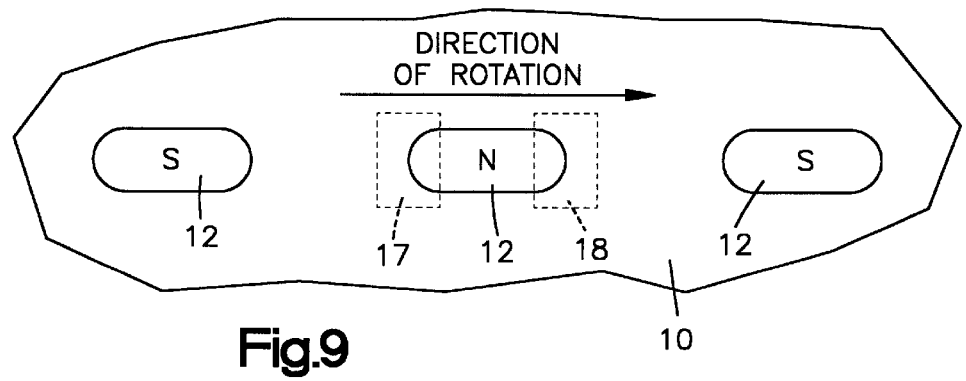
FIG. 9 depicts another relationship between the Hall devices of the FIG. 1 motor and the magnetic circuit windows thereof.

This arrangement is provided due to the selection of certain relative positions of the window (12) with respect to the magnet (9) and Position Sensor (17) with respect to the coils (15). Current of the active part of the winding begins to interact with the permanent magnetic field of the magnet (9) and produces torque in the direction of the rotor rotation. When the other edge of the same magnet (9) coincides with the other edge of the same winding (15) active part as shown in FIG. 7. The Position Sensor (17) turns off the current through the coils (15). At this time the second window (12) edge of the magnetic circuit (10) is now located opposite to the Position Sensor (17), as seen in FIG. 9. When the magnet (9) with one polarity (say "N") is replaced by rotation of magnet (9) with the opposite polarity (say "S"), the position Sensor (17) turns on the current of the opposite polarity through the coils (15). This way, the torque direction is maintained the same. At this time, the edge of window (12) which is located above magnet (9) of the opposite polarity, is located opposite to Position Sensor (17). All phase coils (15) are connected in series, or in series—parallel, or in parallel and thus work simultaneously. As a result, the total torque produced by the phase is equal to the sum of torques of all the coils (15).

The coils (16) of the second phase are shifted with respect to the coils (15) of the first phase—by 90 electrical degrees. As far as everything else the function of the second phase is identical to the described operation of the first.

Figure 8:
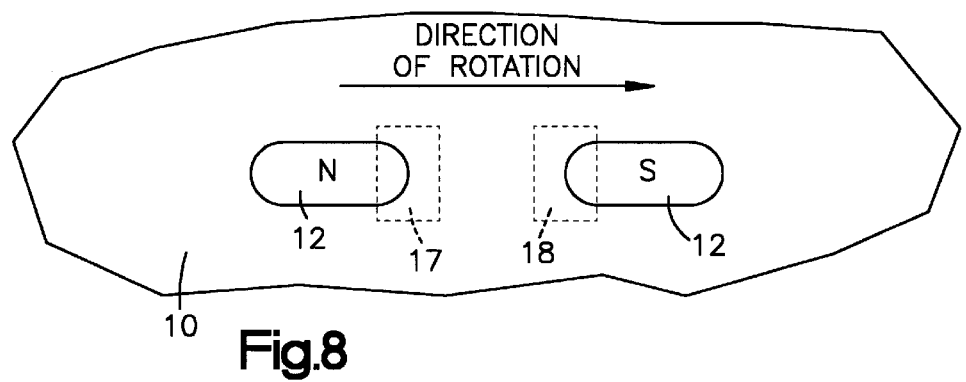
FIG. 8 depicts one relationship between the Hall devices of the FIG. 1 motor and the magnetic circuit windows thereof.

From the foregoing, it is apparent that when a leading edge (42) of a permanent magnet (9) of polarity N has moved across one of the active portions of a coil (15) (FIG. 6) to a position in which the leading edge (42) of the permanent magnet is aligned with the far edge (44) of the coil, the window (12) (FIG. 8) adjacent to the permanent magnet (N) will have moved into partial alignment with the position sensor (17) (as shown in FIG. 8). When this happens, the position sensor (17) provides an output signal which effects operation of a known circuit, indicated schematically at (46) in FIG. 6. In response to the output signal from the position sensor (17), the circuit (46) energizes the coils (15) (FIG. 6) with current of a first polarity. This produces torque in the direction of rotation of the rotor disk 4.

The coils (15) remain energized with the current of a first polarity until the trailing edge (48) of the permanent magnet (N) moves into alignment with an edge (50) (FIG. 7) of the coil (15). When this occurs, the window (12) associated with the permanent magnet (N) will have moved to a position spanning the space between the position sensors (17) and (18) (FIG. 9). When this occurs, the output signal from the position sensor (18) effects operation of the circuit (46) to de-energize the coil (15) (FIG. 7).

The coil (15) has two active parts formed by legs (54, 56) (FIGS. 6 and 7) of the coil. The active part formed by the leg (54) is disposed between the edges (44 and 50). The active part formed by the second leg (56) is of the same size as the active part formed by the first leg (54).

In view of the foregoing we can see that the brushless DC motor of the present invention is an improved motor which provides a trapezoidal functional relation between the motor torque and the rotor angle of rotation of each motor phase, by the selection of specific shapes and relative geometrical dimension of the permanent magnets and the stator coils.

The constancy of this function, which is provided by the design of the invented motor, in combination with the unique ventilation system makes the heat removal from the stator winding highly efficient and allows the motor to reach a high level of motor efficiency (0.9) at speeds in the range of tens of thousands of RPM and specific power ranges of 1 to 2 kWt/kg. In addition, a stable performance of the Hall devices is assured by the fact that holes formed in the magnetic circuit act as a magnetic flux modulator. All of the above factors combine to produce a more reliable motor of simpler design.

Certain modifications and improvements will be come obvious to one of ordinary skill in this art after reviewing this writing. It will be understood that all such improvements and modifications have been deleted herein for the sake of conciseness and readability but are intended to be within the scope of the following claims.

What is claimed is:

1. A brushless DC motor having trapezoidal shaped permanent magnets therein comprising:

a rotor having trapezoidal shaped permanent magnets located thereon to rotate therewith and to provide magnetic flux, said trapezoidal shaped permanent magnets on said rotor have a concave area, said rotor having a plurality of disks and said trapezoidal shaped permanent magnets have center lines perpendicular to a radius of said disks;

a stator having trapezoidal shaped stator coils coaxial with said rotor and with said stator having active parts located in the magnetic field of said permanent magnets of said rotor; a rotor position sensor responsive to magnetic flux from said permanent magnets, said rotor position sensor being located adjacent to said permanent magnets; and means responsive to said rotor position sensor for changing the polarity of current to said stator coils to provide rotation to said rotor thereby.

2. A brushless DC motor having trapezoidal shaped permanent magnets therein comprising:

a rotor having trapezoidal shaped permanent magnets located thereon to rotate therewith, said permanent magnets providing a magnetic field;

a stator having trapezoidal shaped stator coils coaxial with said rotor and with said stator having active parts located in the magnetic field of said permanent magnets of said rotor;

a rotor position sensor located adjacent to said permanent magnets;

means responsive to said rotor position sensor for changing the polarity of current to said stator coils to provide rotation to said rotor thereby; and a plurality of circumferential windows disposed in the magnetic field of said permanent magnets, said windows being located adjacent to said rotor position sensor such that a distance between said edges of each of said windows is determined by the equation:

$$Z=(0.8 \text{ to } 1.2)*W*Q/180°$$

where w=chord of a circular arc which connects centers of adjoining windows (measured in length), Q=commutation zone (measured in degrees), z=distance between window edges.

3. A rotary electrical device comprising:

a housing;

a rotor disposed within and rotatable relative to said housing, said rotor includes a plurality of permanent magnets disposed in a circular array;

a stator connected with said housing, said stator includes a plurality of coils disposed in a circular array adjacent to and spaced from said circular array of permanent magnets;

a magnetic flux conducting member connected with said rotor and disposed adjacent to said circular array of magnets, said magnetic flux conducting member including a plurality of windows through which flux from permanent magnets of said plurality of permanent magnets is conducted; and sensor means connected with said stator for detecting when each of said windows of said plurality of windows is adjacent to said sensor means during rotation of said rotor relative to said stator, said sensor means being responsive to said flux conducted through said windows.

4. A brushless DC motor as set forth in claim 1 wherein said center line of said trapezoidal shaped permanent magnet is equal to 0.7 to 0.9 of the pole pitch length.

5. A rotary electrical device as set forth in claim 3 wherein said sensor means includes a first sensor device and a second sensor device which is spaced a first distance from said first sensor device, each of said windows having an extent which is greater than said first distance.

6. A rotary electrical device as set forth in claim 3 wherein said plurality of windows includes a first number of windows, said plurality of permanent magnets includes a number of permanent magnets equal to said first number of windows.

7. A rotary electrical device as set forth in claim 3 wherein each of said windows of said plurality of windows is aligned with one of said permanent magnets of said plurality of permanent magnets to enable flux from said permanent magnets to be conducted through said windows.

8. A rotary electrical device as set forth in claim 3 wherein each of said coils has active parts with a width of 0.20 to 0.40 of the pole pitch of said stator.

9. A rotary electrical device as set forth in claim 3 wherein each of said coils has a first edge portion and a second edge portion which is offset from said first edge portion, said sensor means including a first sensor device which provides an output signal upon movement of a leading edge portion of one of said permanent magnets into alignment with said first edge portion of one of said coils and a second sensor device which provides an output signal upon movement of a trailing edge portion of one of said permanent magnets into alignment with said second edge portion of one of said coils.

10. A rotary electrical device as set forth in claim 9 wherein said first and second sensor devices are spaced apart by a distance which is less than the distance between opposite ends of one of said windows as measured along a circular arc extending through opposite ends of said one of said windows and having a center disposed on a central axis of said rotor.

11. A rotary electrical device as set forth in claim 3 wherein said rotor includes a plurality of passages through which cooling air is directed toward said coils, each of said passages having an entrance opening through which air flows into the passage and an exit opening through which air flows out of the passage during rotation of the rotor, said entrance opening for each one of said passages disposed on said rotor at a location offset radially inward of said exit opening for said one of said passages and being offset in the direction of rotation of said rotor from said exit opening for said one of said passages.

12. A rotary electrical device as set forth in claim 3 wherein each of said permanent magnets of said plurality of permanent magnets has a trapezoidal shape with a concave area which faces toward a center of said circular array of permanent magnets, said rotor has a plurality of disks and said trapezoidal shaped permanent magnet has a center line which is perpendicular to a radius of said disks.

13. A rotary electrical device as set forth in claim 3 wherein said windows have a distance between edges of adjacent windows determined by the equation:

$$Z=(0.8 \text{ to } 1.2)*W*Q/180°$$

where W=chord of a circular arc which connects centers of adjoining windows (measured in length), Q=commutation zone (measured in degrees), Z=distance between window edges.

14. A rotary electrical device comprising:

a housing;

a rotor disposed within and rotatable relative to said housing, said rotor including a plurality of permanent magnets disposed in a circular array, each of said permanent magnets having a leading edge portion and a trailing edge portion;

a stator connected with said housing, said stator having a plurality of coils disposed in a circular array adjacent to and spaced from said circular array of permanent magnets, each of said coils having a first edge portion and a second edge portion which is offset from said first edge portion in the direction of rotation of said rotor; and detector means for providing an output signal upon movement of the leading edge portion of one of said permanent magnets into alignment with the second edge portion of one of said coils and for providing an output signal upon movement of the trailing edge portion of said one of said permanent magnets into alignment with the first edge portion of said one of said coils.

15. A rotary electrical device as set forth in claim 14 wherein said detector means includes first sensor means connected with said stator for providing an output signal in response to magnetic flux conducted from a permanent magnet of said plurality of permanent magnets upon movement of the leading edge portion of said one of said permanent magnets into alignment with the second edge portion of said one of said coils and second sensor means connected with said stator for providing an output signal in response to magnetic flux conducted from a permanent magnet of said plurality of permanent magnets upon movement of the trailing edge portion of said one of said permanent magnets into alignment with the first edge portion of said one of said coils.

16. A rotary electrical device as set forth in claim 14 wherein said first and second edge portions of each of said coils are spaced apart by a distance equal to 0.20 to 0.40 of the pole pitch of said stator.

17. A rotary electrical device as set forth in claim 14 wherein each of said coils has a pair of active parts, each of said active parts of each of said coils having one of said first edge portions and one of said second edge portions.

18. A rotary electrical device as set forth in claim 14 wherein said detector means includes a first sensor connected with said stator for sensing when the leading edge portion of said one of said permanent magnets moves into alignment with the second edge portion of said one of said coils and a second sensor connected with said stator for sensing when the trailing edge portion of said one of said permanent magnets moves into alignment with the first edge portion of said one of said coils.

19. A rotary electrical device as set forth in claim 14 wherein said rotor includes a plurality of passages through which cooling air is directed toward said coils, each of said passages having an entrance opening through which air flows into the passage and an exit opening through which air flows out of the passage during rotation of the rotor, said entrance opening for each one of said passages disposed on said rotor at a location offset radially inward of said exit opening for said one of said passages and being offset in the direction of rotation of said rotor from said exit opening for said one of said passages.

20. A rotary device as set forth in claim 14 wherein said detector means includes a member connected with said rotor for rotation relative to said stator, said member including a plurality of windows, each of said windows having a length as measured along an arc having a center of curvature on an axis of rotation of said rotor which is greater than the distance between said first and second edge portions of one of said coils, said detector means including sensor means connected with said stator for determining when one edge portion of one of said windows moves to a first position relative to said stator and for detecting when said one edge portion of said one of said windows moves to a second position relative to said stator.

21. A rotary electrical device as set forth in claim 14 wherein said detector means includes a magnetic flux conducting member connected with said rotor and disposed adjacent to said circular array of magnets, said magnetic flux conducting member including a plurality of windows through which magnetic flux is conducted, and sensor means connected with said stator for detecting when each of said windows is adjacent to said sensor means.

22. A rotary electrical device as set forth in claim 14 wherein said detector means includes a plurality of windows connected with said rotor and sensor means for providing an output signal in response to movement of an edge of a window into alignment with said sensor means, said windows having a distance between edges of each of said windows is determined by the equation:

$$Z=(0.8 \text{ to } 1.2)*W*Q/180°$$

where W=chord of a circular arc which connects centers of adjoining windows (measured in length),
Q=commutation zone (measured in degrees),
Z=distance between window edges.

23. A rotary electrical device comprising:
a housing;
a rotor disposed within and rotatable relative to said housing; and a stator connected with said housing, said stator includes a plurality of coils disposed in a circular array adjacent to said rotor, said rotor including a plurality of passages through which cooling air is directed toward said coils of said stator during rotation of said rotor, each of said passages having an entrance opening through which air flows into the passage during rotation of the rotor and an exit opening through which air flows out of the passage during rotation of the rotor, said entrance opening for each one of said passages being disposed on said rotor at a location offset radially inward of said exit opening for said one of said passages and being offset in the direction of rotation of said rotor from said exit opening for said one of said passages.

24. A rotary electrical device as set forth in claim 23 further including detector means connected with said stator for sensing when said permanent magnets are in predetermined positions relative to said coils, said sensor means being activated to provide an output signal in response to magnetic flux from one of said permanent magnets upon movement of said permanent magnets to said predetermined positions relative to said coils.

25. A rotary electrical device as set forth in claim 23 further including a plurality of openings formed in said housing, said openings in said housing being disposed the same distance from an axis of rotation of said rotor as said entrance openings for said passages to promote a flow of air through said openings in said housing into said passages in said stator.

26. A rotary electrical device comprising:
a housing; a rotor disposed within and rotatable relative to said housing, said rotor includes a plurality of spaced apart permanent magnets disposed in a circular array;
a stator connected with said housing, said stator includes a plurality of coils disposed in a circular array adjacent to and spaced from said circular array of permanent magnets and said stator having a predetermined pole pitch length, each of said coils having radially extending active parts with a width of about 0.2 to 0.4 of said pole pitch length; and
each of said magnets spaced a predetermined distance apart and having a width of about 0.7 to about 0.9 of said pole pitch length, as measured along a line extending through a center of each respective magnet and perpendicular to a radius which extends through the center of each respective magnet and through a center of the circular array of magnets.

27. A rotary electrical device as set forth in claim 26 wherein each of said active parts of each of said coils has a first edge portion and a second edge portion which is offset from said first edge portion in the direction of rotation of said rotor by a distance equal to the width of said active part, said rotary device further including detector means for providing an output signal upon movement of a leading edge portion of one of said permanent magnets into alignment with the second edge portion of the active part of one of said coils and for providing an output signal upon movement of the trailing edge portion of said one of said permanent magnets into alignment with the first edge portion of said one of said coils.

28. A rotary electrical device as set forth in claim 26 further including a member connected to said rotor for rotation relative to said stator, said member including a plurality of windows, each of said windows having a length as measured along an arc having a center of curvature on an axis of rotation of said rotor which is greater than the width of one of the active parts of one of said coils, said device further including sensor means connected with said stator for detecting when one of said windows moves to a first position relative to said stator and for detecting when said one of said windows moves to a second position relative to said stator, said first position being offset from said second position by a distance which is equal to the width of one of the active parts of one of said coils.

29. A rotary device as set forth in claim 28 wherein said windows have a distance between edges of adjacent windows determined by the equation:

$$Z = (0.8 \text{ to } 1.2) * W * Q / 180°$$

where W=chord of a circular arc which connects centers of adjoining windows (measured in length), Q=commutation zone (measured in degrees), Z=distance between window edges.

30. A rotary device as set forth in claim 28 wherein said windows have a distance between edges of adjacent windows determined by the equation:

$$Z = (0.8 \text{ to } 1.2) * W * \frac{Q}{180},$$

where w=chord of a circular arc which connects centers of adjoining windows,

Q=commutation zone, z=distance between window edges.

31. A rotary electrical device as set forth in claim 26 further including sensor means for sensing magnetic flux from one of said permanent magnets and providing a first output signal in response to movement of said one of said permanent magnets to a first position relative to said stator and for providing a second output signal in response to movement of said one of said permanent magnets through a distance from said first position equal to the width of an active part of one of said coils.

32. A rotary electrical device as set forth in claim 26 wherein said rotor includes a plurality of passages through which cooling air is directed toward said coils, each of said passages having an entrance opening through which air flows into the passage and an exit opening through which air flows out of the passage during rotation of the rotor, said entrance opening for each one of said passages disposed on said rotor at a location offset radially inward of said exit opening for said one of said passages and being offset in the direction of rotation of said rotor from said exit opening for said one of said passages.

33. A rotary electrical device as set forth in claim 26 wherein each of said coils further comprises an angle formed between radiuses of said stator extending through centers of said active parts of each respective coil is equal to about 360° divided by the number of permanent magnets.

34. A rotary electrical device as set forth in claim 12 wherein each of said magnets further comprises first and second concave base portions spaced radially apart.

35. A rotary electrical device as set forth in claim 26 wherein each of said magnets is spaced apart from adjacent respective magnets from a distance of about 0.1 to about 0.3 of said pole pitch length of said stator.

* * * * *

UNITED STATES PATENT AND TRADEMARK OFFICE
CERTIFICATE OF CORRECTION

PATENT NO. : 5,892,307
DATED : April 6, 1999
INVENTOR(S) : Lisseikine Viatcheslav Pavlovich, et al.

It is certified that error appears in the above-identified patent and that said Letters Patent is hereby corrected as shown below:

Column 16, line 21, change "12" to "26"

Signed and Sealed this

Tenth Day of October, 2000

Attest:

Q. TODD DICKINSON

*Attesting Officer*   *Director of Patents and Trademarks*